Figure 1:
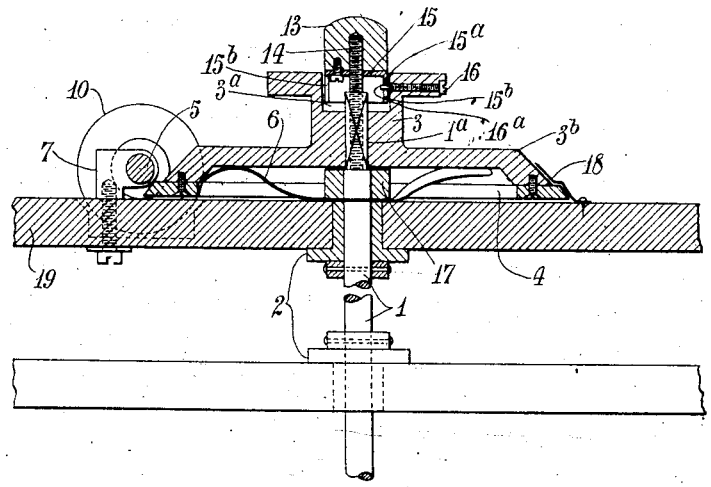

W. H. EDRIDGE AND E. E. G. BOITE.
WORM GEARING ADJUSTMENT APPLICABLE TO VARIABLE CONDENSERS FOR WIRELESS TELEGRAPHY AND TELEPHONY.
APPLICATION FILED MAR. 26, 1919.

1,310,329.

Patented July 15, 1919.
4 SHEETS—SHEET 1.

INVENTORS
Walter H. Edridge.
E. E. G. Boité
by
ATTY.

W. H. EDRIDGE AND E. E. G. BOITE.
WORM GEARING ADJUSTMENT APPLICABLE TO VARIABLE CONDENSERS FOR WIRELESS TELEGRAPHY AND TELEPHONY.
APPLICATION FILED MAR. 26, 1919.
1,310,329.
Patented July 15, 1919.
4 SHEETS—SHEET 2.
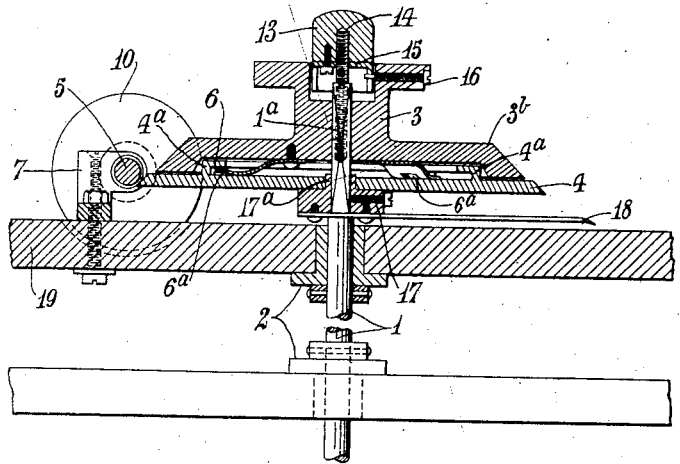
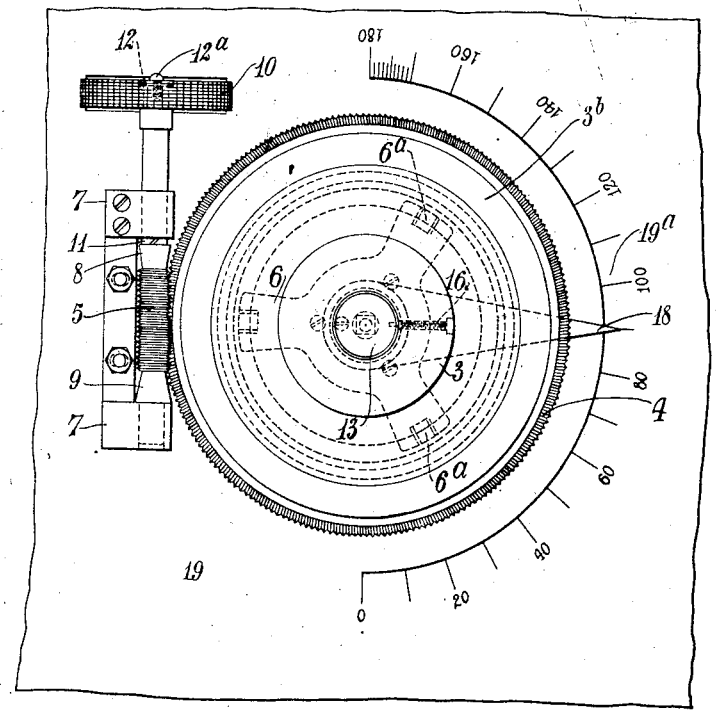
INVENTORS
Walter H. Edridge.
E. E. G. Boite.

W. H. EDRIDGE AND E. E. G. BOITE.
WORM GEARING ADJUSTMENT APPLICABLE TO VARIABLE CONDENSERS FOR WIRELESS TELEGRAPHY AND TELEPHONY.
APPLICATION FILED MAR. 26, 1919.

1,310,329.

Patented July 15, 1919.
4 SHEETS—SHEET 3.

INVENTORS
Walter H. Edridge.
E. E. G. Boite.

UNITED STATES PATENT OFFICE.

WALTER H. EDRIDGE, OF WOOLWICH, LONDON, ENGLAND, AND ERNEST E. G. BOITE, OF HAVRE, FRANCE.

WORM-GEARING ADJUSTMENT APPLICABLE TO VARIABLE CONDENSERS FOR WIRELESS TELEGRAPHY AND TELEPHONY.

1,310,329.

Specification of Letters Patent.

Patented July 15, 1919.

Application filed March 26, 1919. Serial No. 285,873.

*To all whom it may concern:*

Be it known that we, WALTER HENRY EDRIDGE and ERNEST EDWARD GILBERT BOITE, subjects of His Majesty the King of Great Britain, and residents, respectively, of Woolwich, in the county of London, Kingdom of England, and Havre, in the Republic of France, have invented certain new and useful Improvements in Worm-Gearing Adjustments Applicable to Variable Condensers for Wireless Telegraphy and Telephony, of which the following is a specification.

This invention relates to improvements in worm gearing adjustments applicable to variable condensers for wireless telegraphy and telephony.

The invention has for its primary object to provide apparatus embodying worm gearing adjustments with improved means whereby a spindle or other member can be angularly adjusted easily and quickly to obtain an approximate required position of same, said spindle or member can be minutely and finely adjusted with great precision, and the spindle or member is automatically locked in any of its adjusted positions.

As above mentioned the invention particularly lends itself to the adjustment of variable condensers used in wireless telegraphy and telephony receiving timers and continuous wave transmitters, and especially to the type of condenser having stationary and movable vanes, the movable vanes being mounted on a main spindle which is free to rotate through 180 degrees to adjust the said movable vanes relatively to the stationary vanes. The invention, therefore, will now be described as applied to the above-mentioned type of condenser, but it must be understood that the invention is applicable generally to apparatus other than condensers and in which a spindle or other member is adapted to be angularly adjusted by worm gearing.

Thus, in carrying out the invention in connection with the condenser, said invention provides a micrometric angular adjustment of the rotary main spindle of the condenser by means of a reduction worm gearing which, being irreversible, locks the said spindle in the position to which it has been adjusted, and provides, in some constructions, means for automatically throwing out of gear the said irreversible reduction gearing when the angular position of the said spindle is being directly controlled, to obtain an approximate adjustment, through the handle usually provided on such condensers, the said irreversible reduction gearing being thrown automatically back into gear when the said handle is released to thereby automatically relock the spindle substantially as is the case when the position of the spindle is controlled through the reduction gearing.

The invention also embodies means for maintaining the reduction gearing out of gear notwithstanding the release of the handle by the operator, and also for the control of the position of the spindle, without increasing the length of the latter, from such a distance as will insure that the hand of the operator will not produce an appreciable variation of the capacity of the circuit to which the variable condenser is connected.

Further, the invention provides means for preventing the over-turning of the worm gearing when the main spindle is mechanically prevented from rotating through more than a definite angle, and means for preventing end play in the worm spindle of said gearing.

Again, the invention embodies constructions in which the worm gearing is permanently in engagement, and means permitting the control of the angular position of the main spindle either indirectly through said gearing or directly through a handle fixed on said spindle.

In the drawings:—

Figure 2:
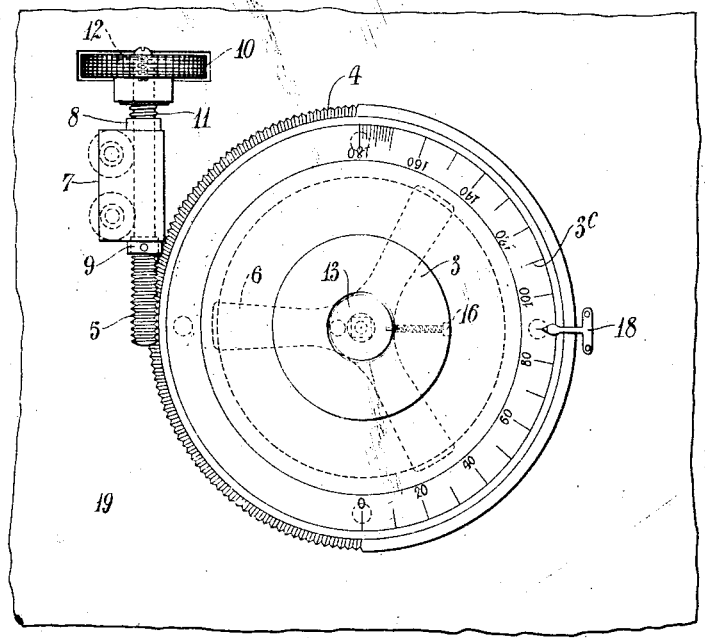

Figure 1 is a sectional elevation illustrating one method of carrying out the invention, and Fig. 2 is a plan of same.

Figs. 3 and 4, 5 and 6 are views similar to Figs. 1 and 2 and showing two modified constructions of the apparatus.

Figure 7:
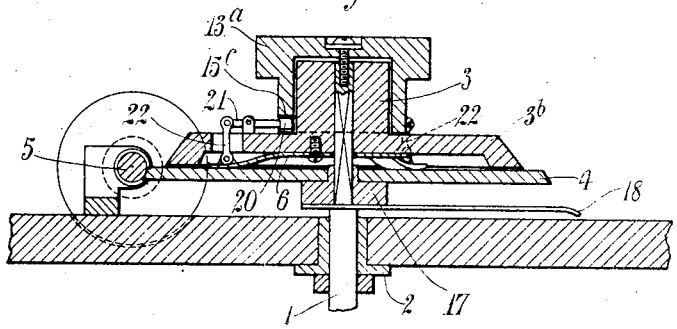
Figure 8:
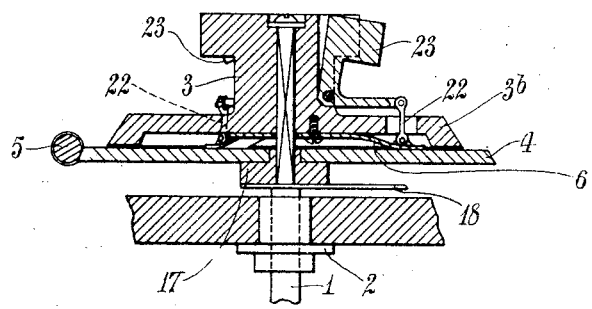

Figs. 7 and 8 are detail partly sectional elevations illustrating two further modifications.

In the construction shown in Figs. 1 and 2 the main spindle 1, supported by one or more bearings 2, carries a handle 3, made preferably of insulating material, free to slide axially upon a squared portion $1^a$ of the said spindle.

A metal ring or worm wheel 4, having teeth cut on its outer periphery, is fixed to the handle 3 concentrically to the spindle 1 and in a plane at right angles to the axis of the said spindle 1. As the ring 4 is fixed to the handle 3 it cannot rotate upon and relatively to the spindle. The teeth on the ring 4 are normally maintained in mesh with the screw-threads on a worm spindle 5 by means of a star spring 6 fitted loosely around the spindle 1 and bearing upon the under surface of the handle 3. The spindle 1 may be directly rotated through 180 degrees by means of the handle 3 after having exerted a slight pressure on the said handle 3 in the direction of the bearings 2 and disengaged the teeth on the ring 4 from the threads on the worm spindle 5. When released the handle 3 returns to its normal position under the action of the spring 6, thus reëngaging the teeth on the ring 4 with the threads on the worm spindle 5 and automatically locking the spindle 1 in the required approximate angularly adjusted position.

The worm spindle 5 is supported by the bearing 7, and fixed to the said spindle are two collars 8 and 9 to prevent end play of the same in the bearing 7, the collar 9 preferably being adjustable on the threads of the spindle. The worm spindle 5 carries an operating knob 10 which is preferably a loose fit upon the spindle and adapted to rotate the latter by friction between a spring 11, the collar 8, a washer 12 fixed to the end of the spindle, and the said operating knob 10. The worm drive, consisting of the toothed ring 4 in combination with the worm spindle 5 and the fixed bearing 7, is normally in gear and constitutes a locking device for the spindle 1 in its angularly adjusted positions. The said worm drive is, however, also employed as a means for accurately controlling and obtaining a fine adjustment of the angular position of the spindle 1 by the rotation of the knob 10. The object of the friction drive between the knob 10 and the worm spindle 5 is to prevent damaging the threads and teeth of the worm gear should it be attempted to rotate the spindle 1 beyond the maximum limit by means of the said knob.

A stud 13 is fitted loosely into a recess 3ª formed in the upper end of the handle 3, projects above the same, and is fixed to a screw-threaded spindle 14, which is screwed loosely into the upper end of the spindle 1. To the under surface of the stud 13 is fixed an inverted cup-shaped metal cam member 15, the cam surface of said member being cut out of the cylindrical portion of same. In the normal position of the handle 3, and of the stud 13 with reference thereto, the teeth on the ring 4 engage with the threads on the worm spindle 5. By rotating the stud 13 in one direction through about 90 degrees with reference to the handle 3 the projecting surface 15ª of the cam member 15 is caused to bear downward upon the end 16ª of a screw 16 which is fixed radially into the handle 3 so that said end projects into the recess 3ª containing the stud 13 and the cam member 15. In this manner the handle 3 is displaced downward on the spindle 1 against the action of the spring 6, and the teeth on the disk 4 are maintained disengaged from the threads on the worm spindle 5 until the stud 13 is turned back again. The shape of the cam surface on the member 15 is such that two stops 15ᵇ are provided and the stud 13 cannot be rotated through a greater angle than that required to produce the disengagement of the worm gearing above described. Fig. 1 illustrates the worm gearing disengaged by medium of the stud and cam member.

A spacing collar 17 is fitted loosely on the spindle 1 between the upper bearing 2 and the handle 3, and the object of the said collar is to limit the displacement of the handle downward upon the spindle. The loose fitting of the collar 17 upon the spindle 1 insures that the downward pressure applied to the handle 3 is not communicated to the said spindle. Fig. 2 shows the disk 3ᵇ forming part of the handle 3 graduated in degrees at 3ᶜ and the angularly adjusted position of the spindle 1 relatively to the bearings 2 is indicated by a pointer 18 coöperating with the graduations.

If desired, in a modification, a pointer fixed to the spindle 1 either above or below the toothed ring 4 and passing through a slot in the disk portion 3ᵇ of the handle 3 may be employed to indicate the angular position of the spindle 1, said pointer being adapted to coöperate with graduations on the base 19. The graduations may also be marked on a disk secured to the spindle 1 either below or above the toothed ring 4 and independently of the handle 3 to which the said toothed ring 4 is fixed.

In the modification illustrated in Figs. 3 and 4, the main spindle 1 is supported by one or more bearings 2 and carries an axially slidable handle 3 as before. A metal disk 4 having teeth cut on its outer edge is constrained to remain concentric with the main spindle 1 and in a plane at right angles to the axis of the said spindle. In this form of the apparatus, however, the teeth on the disk 4 remain permanently in contact with the threads on the worm spindle 5, the star spring 6 is fixed to the underside of the handle 3, and the spindle 1 can rotate independently of the disk 4. The worm spindle 5 is supported by one or more bearings, two collars 8 and 9 are secured upon said spindle to prevent end play of the latter in the bearings 7, and an operating knob 10 is fixed to the spindle 5 which also carries a spring 11. A friction drive between the knob 10 and the worm spindle 5 being unnecessary in the construction shown in Figs.

3 and 4 the spring 11 is employed to compensate for wear between the collars 8 and 9 and the bearings 7, and the washer 12 is employed to distribute the pressure of the screw 12ª fixing the knob to the end of the spindle.

Figs. 3 and 4 illustrate an application of the invention to the control of the angular position of a main spindle 1 the direct rotation of which by means of a handle of the usual dimensions necessitates as great an effort as can conveniently be made by the hand of the operator. Figs. 3 and 4 therefore include a stud 13 fitting loosely into a recess 3ª in the handle 3, fixed to a spindle 14 screwed loosely into the main spindle 1, and carrying a metal cam member 15, the said stud and the cam member being free to rotate through a sufficient angle to cause the projecting surface of the cam to bear downward upon a screw 16 fixed radially to the handle 3; all substantially as before described in connection with Figs. 1 and 2.

The stud 13, spindle 14, cam member 15 and projecting screw 16 are in Figs. 3 and 4, fitted to apparatus in which the rotation of the main spindle 1 requires a considerable effort in order to permit of such compression of the spring 6 as will insure that the friction between the ends of the said spring 6 and the toothed ring 4 will cause the rotation of the said spindle through the handle 3 when the said toothed ring is rotated by means of the knob 10 fixed to the worm spindle 5. When it is required to directly rotate the main spindle 1 by means of the handle 3, fitted to slide axially on the squared portion 1ª of the said spindle, the stud 13 is rotated back to such a position that the projecting surface of the cam member 15 no longer bears upon the screw 16; the pressure upon the spring 6 through the handle 3, and the pressure of the spring upon the disk 4, being thereby relaxed, the main spindle 1 may be freely rotated by means of the handle 3 without the additional effort which would otherwise be necessary to overcome the friction between the spring 6 and the disk.

A collar 17 is fixed to the main spindle 1 and supports the toothed ring 4 which is fitted loosely around a boss 17ª on said collar. A pointer 18 is shown fixed to the main spindle 1 through the collar 17 and coöperating with a scale 19ª engraved in degrees on the base 19 carrying the bearings 2.

Figure 5:
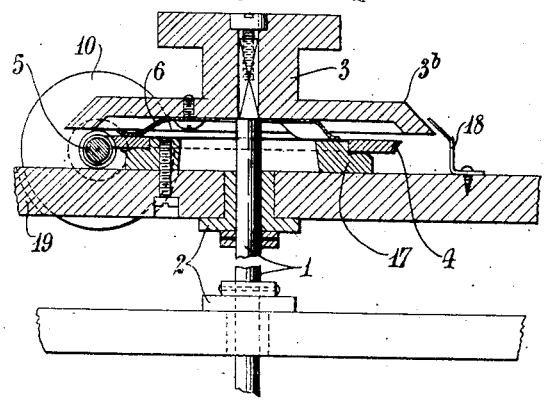
Figure 6:
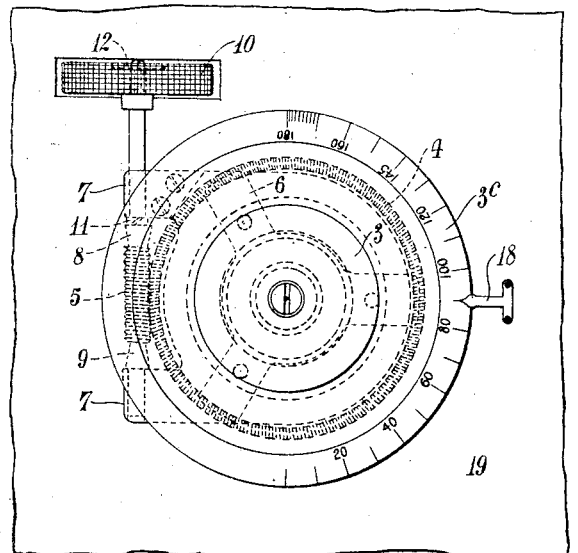

Figs. 5 and 6 correspond to an application of the invention more especially adapted to the adjustment of the angular position of a main spindle the rotation of which, by means of the handle 3, requires a very slight effort. The collar 17 is fixed to the base 19 concentrically to the main spindle 1 and serves not only as a support and guide to the loosely mounted toothed ring 4 but also carries the bearings 7 of the worm spindle 5. The teeth of the toothed ring 4 are shown as being maintained in contact with the threads on the worm spindle 5 by the pressure of the spring 6. The pointer 18 is shown fixed to the base 19 carrying the bearings 2 and coöperating with a scale 3ᶜ engraved in degrees on a disk 3ᵇ forming part of the handle 3.

In Figs. 3 and 4 the ends 6ª of the radial arms of the spring 6 are shown split, alternate segments of the split ends pressing against the upper and lower inner surfaces of an annular channel 4ª formed on the toothed disk 4. This arrangement permits of obtaining the required frictional drive between the spring 6 and the toothed disk 4 without unnecessary friction between the said disk and the collar 17, and may be advantageously employed in the form of the apparatus shown in Figs. 5 and 6 as well as in modifications illustrated in Figs. 3 and 4 or 5 and 6.

If desired, and as illustrated in Fig. 7, the stud 13, cam member 15 and screw 16 of Figs. 3 and 4 may be replaced by a cap 13ª loosely mounted to rotate to a limited extent, upon the upper end of the handle 3 and having its lower edge formed with cam surfaces 15ᶜ adapted to coöperate with rollers 20 fitted on the inner ends of levers 21 pivoted on the disk 3ᵇ of the handle 3, the outer ends of said levers being connected, such as by links 22, to the arms of the spring 6 adapted to bear upon the toothed disk 4. In a slightly modified arrangement the cap 13ª may be adapted to slide up and down upon the handle 3 but not to rotate thereon. In either construction, when the cap is rotated in either direction, or pressed down, as the case may be, the levers 21 are rocked on their pivots and lift the arms of the spring 6 away from the toothed disk 4, thus freeing the frictional drive between the handle 3 and said disk through said spring and enabling the spindle 1 to be directly and freely rotated in either direction by means of the cap through the handle by rotating said cap. When the cap 13ª is released the arms of the spring 6 return to their operative positions upon the disk 4 and return the cap 13ª and the levers 21 to their normal positions, and the spindle 1 is automatically locked in its angularly adjusted position through the handle 3, spring 6, disk 4 and worm spindle 5. In still another construction, Fig. 8, the handle 3 may be fitted with pivoted sectors 23 forming parts of said handle and connected to the arms of the spring 6 by links 22, the arrangement being such that when the handle is grasped the spring arms are lifted and released from the toothed disk 4 thus enabling the spindle 1 to be directly rotated by turning the handle, the parts automatically returning to their normal positions when the handle is released, and the spindle being automatically locked in its angularly adjusted position through the handle 3, spring 6, disk 4 and worm spindle 5.

If desired, the lever mechanisms above described, or other mechanisms similar to them, may be used in combination with the stud and cam mechanism illustrated in Figs. 3 and 4.

In Figs. 3 to 6 the spring 6 may be arranged between the toothed disk or ring 4 and the base 19 and be secured either to the main spindle 1 or to said base in such manner that it presses the disk or ring into contact with the disk portion 3b of the handle 3.

The handle 3, the toothed disk or ring 4, or the collar 17 may be made sufficiently flexible and resilient to permit of dispensing with the spring 6.

What we claim is:—

1. In apparatus of the character described, a main spindle adapted to be angularly adjusted, a member connected with the main spindle to turn it and having worm teeth, a drive spindle having a worm to normally engage the worm teeth, a handle connected with the main spindle to turn it and adapted to be shifted to one direction to effect the disengagement between the worm teeth and worm and subsequently turned to turn the main spindle, and means to hold the handle in the shifted position and permit of its turning movement.

2. In apparatus of the character described, a main spindle adapted to be angularly adjusted, a member splined upon the main spindle to move longitudinally thereof and rotate therewith and having worm teeth, a drive spindle having a worm to normally engage the worm teeth, a handle carried by the main spindle and adapted to be moved longitudinally thereof to shift the member for effecting a disengagement between the worm teeth and worm, said handle being adapted to turn the main spindle.

3. In apparatus of the character described, a main spindle adapted to be angularly adjusted, a member splined upon the main spindle to move longitudinally thereof and rotate therewith and having worm teeth, a drive spindle having a worm arranged above the worm teeth and normally engaging the same, a handle slidable upon the main spindle and arranged above said member to move it downwardly when the handle is depressed, said handle also serving to turn the main spindle, and a spring arranged beneath said member to move it upwardly so that said worm teeth engage with the worm.

4. In apparatus of the character described, a main spindle adapted to be angularly adjusted, a member splined upon the main spindle to move longitudinally thereof and rotate therewith and having worm teeth, a drive spindle having a worm arranged above the worm teeth and normally engaging the same, a handle arranged above and connected with said member, a device connected with the main spindle and adapted to depress the handle, said device including a rotatable stud, and means to move the member upwardly.

5. In apparatus of the character described, a main spindle adapted to be angularly adjusted, a member splined upon the main spindle to move longitudinally thereof and rotate therewith and having worm teeth, a drive spindle having a worm arrranged above the worm teeth and normally engaging the same, a handle arranged above and connected with said member, a device connected with the main spindle and adapted to depress the handle, said device including a rotatable stud pivotally connected with the main spindle, an element secured to the stud and provided with a cam face and a pin carried by the handle to engage the cam face, and yielding means to move said member upwardly.

In testimony whereof we have hereunto signed our names.

W. H. EDRIDGE.
E. E. G. BOITE.